United States Patent [19]
Cross

[11] Patent Number: 5,570,278
[45] Date of Patent: Oct. 29, 1996

[54] CLAMPED CONTINUOUS FLYBACK POWER CONVERTER

[75] Inventor: David A. Cross, Sai Kung, Hong Kong

[73] Assignee: Astec International, Ltd.

[21] Appl. No.: 201,653

[22] Filed: Feb. 25, 1994

[51] Int. Cl.[6] .................................................. H02M 3/335
[52] U.S. Cl. ............................. 363/20; 363/97; 363/131
[58] Field of Search .................................. 363/15, 16, 20, 363/21, 97, 131; 307/83

[56] References Cited

U.S. PATENT DOCUMENTS

| | | | |
|---|---|---|---|
| 4,481,565 | 11/1984 | Colton | 363/56 |
| 4,500,949 | 2/1985 | Prete | 363/28 |
| 4,665,357 | 5/1987 | Herbert. | |
| 4,914,561 | 4/1990 | Rice et al. | 363/126 |
| 4,958,268 | 9/1990 | Nagagata et al. . | |
| 4,959,764 | 9/1990 | Bassett . | |
| 5,057,986 | 10/1991 | Henze et al. . | |
| 5,126,931 | 6/1992 | Jitaru . | |
| 5,146,394 | 9/1992 | Ishii et al. | 363/16 |
| 5,430,633 | 7/1995 | Smith | 363/20 |

FOREIGN PATENT DOCUMENTS 474312A  3/1992  European Pat. Off. ....... H02M 3/335

OTHER PUBLICATIONS

Hua, et al., "Development of a DC Distributed Power System", *Proceedings of the APEC '94 Ninth Annual Applied Power Electronics Conference*, Feb. 13, 1994, pp. 763–769.

Watson, et al., "Characterization of an Active Clamp Flyback Topology for DC/DC Conversion and Power Factor Correction Applications", *Proceedings of the APEC '94 Ninth Annual Applied Power Electronics Conference*, Feb. 13, 1994, pp. 412–413.

Carsten, "Design Techniques for Transformer Active Reset Circuits at High Frequencies and Power Levels", *HFPC*, May 1990 Proceedings, pp. 235–246.

Yoshida et al., "Zero Voltage Switching Approach For Flyback Converter", *Fourteenth International Telecommunications Energy Conference*, Intelec '92 Oct. 4–Oct. 8, 1992, pp. 324–329.

*Primary Examiner*—Peter S. Wong
*Assistant Examiner*—Y. Jessica Han
*Attorney, Agent, or Firm*—Coudert Brothers

[57] ABSTRACT

Size reduction in a clamped power converter can be achieved, and stability of the converter under no-load and transient loads can be substantially improved, by operating the converter in a continuous flyback mode.

30 Claims, 3 Drawing Sheets

CLAMPED CONTINUOUS FLYBACK POWER CONVERTER

FIELD OF THE INVENTION

The present invention relates to switching power supplies and, more particularly to flyback power converters having improved efficiency and compactness.

BACKGROUND OF THE INVENTION

Electrical power converters are devices for processing electrical power from one form, such as an AC or unregulated DC voltage, into another form, such as one or more regulated DC output voltages. One conventional type of electrical power converter that produces a regulated output voltage is a switching power supply, also commonly referred to as a switch mode power supply or a switched power supply.

Conventional switching power supplies commonly include a power transformer and one or more power switches for alternately coupling an unregulated DC or rectified AC voltage across a primary winding of the power transformer in a series of voltage pulses. These pulses are converted into a series of voltage pulses across one or more secondary windings of the power transformer and then rectified and filtered to provide one or more output DC voltages. The output voltage or voltages of the power converter are commonly regulated by controlling the relative amount of time that the power switch is on (i.e., the duty cycle).

One common type of switching power supply is the flyback power converter, also referred to as an energy storage converter. A flyback power converter works by cyclically storing energy in the power transformer, and then dumping this stored energy into a load. By varying the amount of energy stored and dumped per cycle, the output power can be controlled and regulated. A high power switching transistor connected in series with the primary winding of the power transformer normally provides such a switching function. That is, the on-time and off-time of this power switch controls the amount of energy coupled across the power transformer. When the power switch is on, current flows through the primary winding of the power transformer, and energy is stored in the transformer. When the power switch is off, the stored energy is transferred out into a secondary circuit by means of current flowing out of one or more secondary windings of the power transformer. Note that the secondary current does not flow in the power transformer at the same time that the power switch is on and the primary current is flowing. The reason for this is that in a conventional flyback power converter, a rectifier is coupled to the secondary winding to prevent conduction of current in the secondary winding when the power switch is on.

More specifically, at the beginning of each switching cycle of a conventional flyback power converter, the power switch turns on and couples an input voltage across the primary winding such that current in the primary winding ramps up from zero, thereby storing magnetic energy in the power transformer. The period of time during which the power switch is on is referred to as the drive cycle or drive period. After the power switch is turned off, current through the primary winding is sharply reduced and the voltage across the transformer windings reverses. Reversing the voltage across the secondary winding forward biases the secondary-side rectifier and allows current to be conducted through the secondary winding, thereby releasing the energy stored in the power transformer. This secondary current initially quickly reaches a relatively high value and then decreases over time as energy from the transformer is released. The voltage across the secondary winding initially reaches a high reverse value and decreases slowly during the flyback cycle. The energy from the transformer is coupled to and stored on an output capacitor to produce the desired output voltage. The period of time during which energy is released from the secondary winding is referred to as the flyback cycle or flyback period.

There are two main types of flyback converters. In most conventional flyback converters, the energy stored in the transformer is totally coupled to the output load before the next drive cycle, generally resulting in the secondary current reaching zero during the flyback cycle. Such flyback converters generally are referred to as discontinuous flyback converters. By contrast, in continuous flyback converters, the next drive cycle begins before all stored magnetic energy is released from the transformer, and therefore before the secondary current reaches zero. Discontinuous flyback convertors are more common than continuous flyback converters because relatively simple control circuitry can be used to maintain output voltage regulation by varying the frequency and/or on-time of the power switch to accommodate heavy or light load conditions.

Flyback power converters are advantageous at lower power levels over other switching power converters due to the fact that they are generally simpler, they require a reduced number of components, and they allow multiple regulated outputs to be available from a single supply. Common applications for flyback converters are AC adapters, which may, for example, deliver an output voltage in the range of between 9 VDC to 24 VDC at power levels of 20 to 50 Watts, drawing power from a rectified AC mains, which may vary between 85 VAC to 270 VAC. One reason flyback converters are preferred to other converters for these applications is that they do not require an output choke under these voltage and power conditions.

Conventional flyback converters generally are not used at high power levels, especially at high switching frequencies, because they have many disadvantages that become particularly troublesome under such conditions. In fact, flyback converters are rarely used at power levels exceeding 100 or 200 Watts.

A first disadvantage of using a flyback power converter in high power applications is that flyback converters for such applications are often undesirably bulky. This is due to the need to use bulky transformers, which are typically necessary to store the high amounts of energy that must be transferred from the primary to the secondary of the transformer. One way to allow for smaller transformers is to incorporate an air gap of some appreciable size into the transformer core. The air gap allows greater current capability in the transformer before saturation of the core and, therefore, increases the energy-storage capabilities of a given sized transformer. An air gap, however, generally results in a relatively large leakage inductance, which causes a number of well-known problems including reduced power conversion efficiency. The size of the transformer can also be reduced by operating the flyback converter at high power switching frequencies, so that current conducted through the transformer windings is less likely to reach a level sufficient to cause saturation. As is well known, however, high switching frequencies (e.g., 200 KHz to 2 MHz) can lead to excessive power dissipation in the power switch.

A second disadvantage of using flyback power converters at high power levels is that flyback converters generally have poor power conversion efficiency and high power dissipation under such circumstances. As noted above, the relatively large leakage inductance caused by the air gap in the transformer core is one factor that decreases the power conversion efficiency of the flyback in comparison to other converters. When the power switch is turned on, energy is stored in both the transformer's core (the magnetizing inductance) and in the leakage inductance. When the power switch is turned off, the energy in the core (magnetizing inductance) is coupled to the secondary circuit, but the energy stored in the leakage inductance rings with the capacitance of the power switch, and is conventionally dissipated in a voltage clamping or "snubber" circuit connected to the power switch. In a discontinuous mode flyback converter, this dissipated energy can easily be as much as ten percent (10%) of the energy transferred to the secondary circuit when using a safety isolated transformer.

Another factor that decreases the power conversion efficiency is the relatively large root-mean-square (RMS) current that flows in the secondary winding during the flyback period. As is known in the art, the current through the secondary winding during the flyback period has a waveform that begins at a value substantially equal to the magnetizing current flowing in the primary winding at the end of the drive period times the transformer turns ratio and decreases substantially linearly to a lower value (in a discontinuous converter the secondary current falls to zero). Because the current waveform has a high initial current value, it has a relatively high RMS value in comparison to a current waveform with lower peak current transferring the same amount of energy. As is known in the art, the resistive losses ($I^2R$) in the secondary winding and secondary circuit are proportional to the square of the RMS current. Discontinuous flyback converters result in particularly high power losses because, for a given output power, the initial peaks must be much higher than the current peaks necessary in continuous flyback converters.

A further factor that decreases the power conversion efficiency of a conventional flyback converter are power dissipation losses that occur in the power switch and other semiconductor components when they are switched. Power switches commonly are metal-oxide semiconductor field-effect transistors (MOSFETs or FETs), although other types of transistors (such as bipolar junction power transistors, BJTs) are sometimes used. FETs are preferred because they can accommodate higher switching frequencies than most bipolar power transistors. However, a measurable amount of power is dissipated in the FET when it is turned on, because the drain voltage takes a finite time to decrease to near zero while drain current is flowing. The drain voltage starts at a value of at least the input voltage. If there is a reverse voltage across the transformer at the beginning of the drive cycle, the drain voltage value is higher than the input voltage. Similarly, at the beginning of each flyback cycle, the secondary-side rectifier becomes forward biased and high current begins to flow immediately, resulting in high power losses during the forward recovery time. Finally, at the beginning of each drive cycle in continuous flyback converters, turning on the power switch causes the secondary-side rectifier to quickly become reverse biased, with very high rates of change in the voltage across and current through the secondary-side rectifier during the reverse recovery period. As is well-known, this fast changing current and voltage during the reverse recovery period results in high reverse recovery power losses in the rectifier. It also results in the generation of unwanted noise which may exceed EMI standards or otherwise cause disruption in other circuits or devices.

In prior art discontinuous flyback converters, turn-on losses have been reduced by implementing "zero voltage switching," that is, by reducing the drain voltage of the FET to approximately zero before it is turned on. It is possible to implement zero voltage switching in discontinuous flyback converters because there is sufficient time to reduce the voltage across the FET to zero during the relatively long flyback cycle. For example, a conventional active clamp can be placed in parallel with the primary winding to create a resonant circuit. Energy stored in the leakage inductance is transferred to the clamp capacitor and back to the primary winding during the flyback cycle, causing a fluctuation in the voltage across the power switch. The circuit is timed such that the voltage across the power switch is zero at the time the flyback cycle concludes. Reduction of this voltage across the power switch is enabled in discontinuous flyback converters because the reverse voltage across the primary winding during the flyback cycle naturally falls to a low value when all magnetic energy has been released from the transformer at the end of the flyback cycle Zero voltage switching, however, does not alleviate the problem of power dissipation due to high current peaks in the secondary winding.

A third disadvantage of using discontinuous flyback converters in high power applications is that adverse effects result from the high peak currents, discussed above, and from the high secondary voltage spike which are generated at the beginning of the flyback period due to the high leakage inductance. The high peak currents may damage many semiconductor components and capacitors and, thus, design choices for these components are limited. The secondary voltage spike results in output voltage noise which must be filtered by a bulky choke in order for the converter to meet conventional output voltage noise specifications. In fact, under high power conditions, the output voltage waveform of a flyback often has undesirably high harmonic content that must be filtered even if the leakage inductance produced spike is not considered.

The present invention is directed toward improving the performance of flyback power converters in each of the above areas.

SUMMARY OF THE INVENTION

Broadly stated, the present invention encompasses a compact flyback-type power converter for efficiently converting an input voltage at an input port to an output voltage provided to a load at an output port. The power converter includes a transformer and a power switch for alternately coupling the input voltage across the primary winding of the transformer. The power switch has an ON state when the input voltage is coupled across the primary winding through the power switch and an OFF state when the input voltage is not coupled across the primary winding through the power switch, where energy is stored in the transformer during the ON state and energy is released from the transformer through a secondary winding during the OFF state. The power switch has a first conduction terminal and a second conduction terminal, conduction of electrical current from the first conduction terminal to the second conduction terminal being enabled only during the ON state, the voltage across the first conduction terminal and the second conduction terminal defining a switch voltage. The power converter also includes a control means for switching the power switch between the ON state and the OFF state such that the flyback power converter operates in a continuous mode, and an output circuit coupled to the secondary winding that produces an output voltage at the output port from the energy released from the transformer during the OFF state. Additionally, the power converter includes means for controlling the switch voltage such that the switch voltage is substantially equal to zero volts when the power switch is switched to the ON state from the OFF state.

In a preferred embodiment, the means for controlling the switch voltage includes a capacitor, a current path enabling electrical current to be conducted from the first conduction terminal of the power switch to the capacitor during the OFF state, and an auxiliary switch coupled between the first conduction terminal and the capacitor, the auxiliary switch having an auxiliary ON state in which electrical current is enabled to be conducted from the capacitor to the first conduction terminal, and an auxiliary OFF state in which electrical current is not enabled to be conducted from the capacitor to the first conduction terminal. The auxiliary switch is switched to the auxiliary ON state while the power switch is in the OFF state, enabling a reverse current to be conducted from the capacitor through the first conduction terminal and the primary winding. The auxiliary switch is then switched to the auxiliary OFF state a selected period of time before the power switch is switched to the ON state such that the reverse current conducted through the primary winding lowers the switch voltage to approximately zero volts before the power switch is switched to the ON state.

In a preferred embodiment, the auxiliary switch is a FET and the current path comprises a body diode of said FET.

Accordingly, it is an object of the present invention to reduce the power dissipation and to improve the power conversion efficiency of flyback converters.

Another object of the present invention is to improve the compactness of flyback converters.

Still another object of the present invention is to allow for zero voltage switching of the main power switch in continuous flyback converters.

Yet another object of the present invention is to capture and reuse the energy stored in the primary winding leakage inductance of a continuous flyback converter.

A further object of the present invention is to reduce the resistive conduction losses and RMS currents in the secondary winding circuit of a flyback converter.

A still further object of the present invention is to provide a high power, high efficiency, low volume power converter.

Yet a further object of the present invention is to limit high harmonic content in the output voltage of a flyback power converter.

A further object of the present invention is to provide a continuous flyback power converter having a reduced level of EMI in the secondary circuit at the beginning of each drive cycle, and a reduced level of EMI overall.

These and other objects of the present invention will become apparent to those skilled in the art from the following detailed description of the invention, the accompanying drawings, and the appended claims.

DETAILED DESCRIPTION OF THE INVENTION

The present invention comprises a flyback electrical power converter operating in continuous mode and having a power switch operated under zero voltage switching conditions. The flyback power converter is highly efficient and compact, and is suitable for use under high power, high frequency conditions.

The present invention recognizes that continuous flyback converters operating at high frequencies will have much lower secondary current peaks than discontinuous power converters for a same output power level, resulting in lower $I_{2R}$ power losses in the secondary circuit. Thus, by providing a means of implementing zero voltage switching in a continuous flyback converter and reducing other common power losses, the present invention provides a power converter that is much more efficient than conventional flyback power converters. The present invention may also be implemented in a relatively compact manner with a relatively low component count.

Zero voltage switching has not previously been available in prior art continuous flyback converters and attempts to provide zero voltage switching have failed. One reason for this is a relatively large amount of energy remains stored in the transformer core during the flyback cycle, and this results in the primary current jumping quickly to a relatively high value at the beginning of each drive cycle, allowing less time for the voltage across the power switch to be reduced to zero. It is difficult to reduce this switch voltage to zero in the relatively short flyback cycle of continuous flyback converters, especially those operating at high frequencies. Additionally, a higher reverse voltage remains across the primary winding of the continuous flyback converter (and therefore at the power switch) at the end of each flyback cycle, resulting in the need to drop additional voltage in order to bring the voltage across the power switch to zero.

Figure 1:
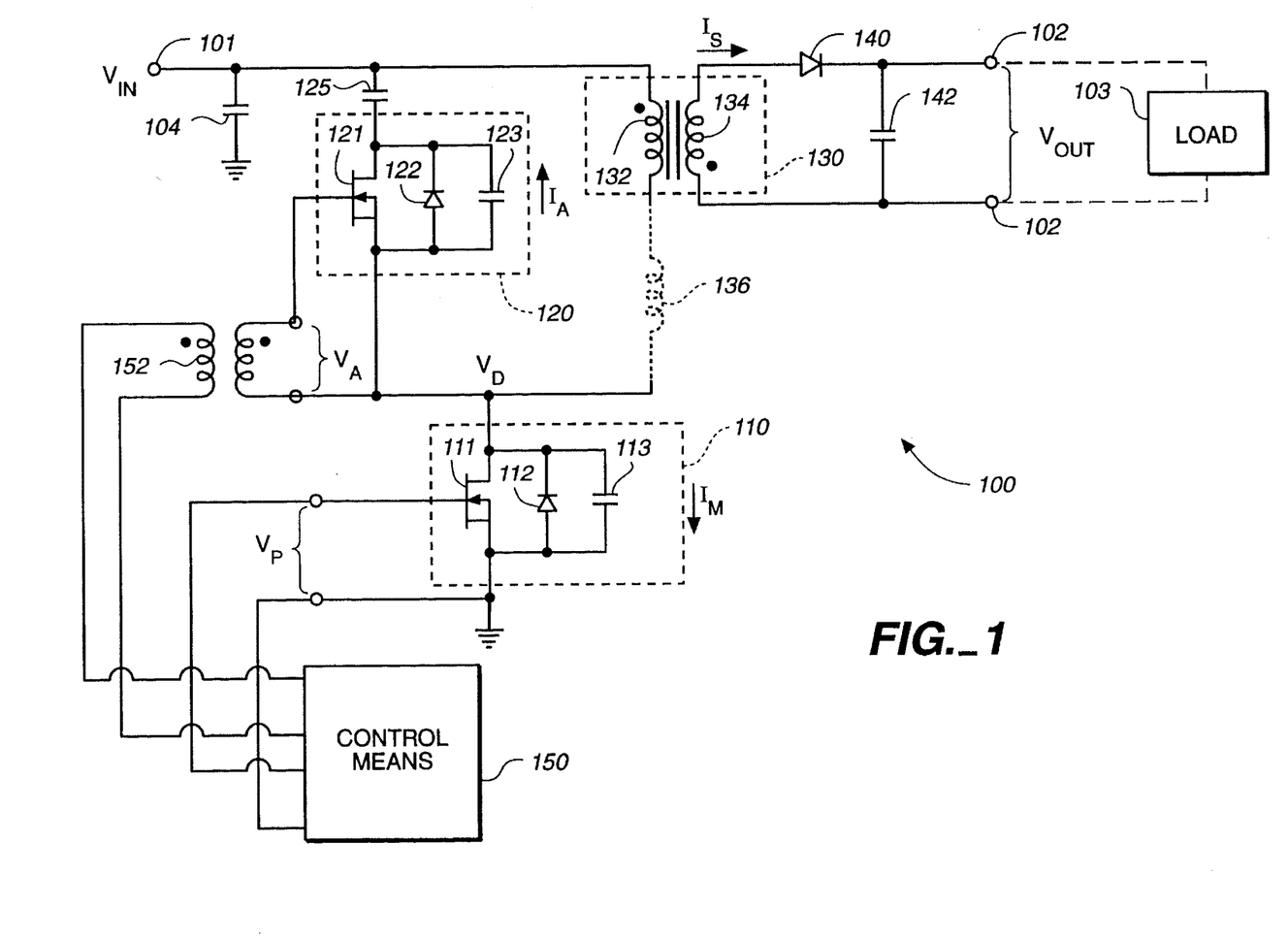
FIG. 1 is a schematic diagram of a first embodiment of a flyback converter according to the present invention.

Referring now to FIG. 1, a flyback power converter according to the present invention is shown at 100. Power converter 100 receives an input voltage ($V_{IN}$) at an input port 101 and converts it to an output voltage ($V_{OUT}$) at output port 102, which is preferably coupled to a load 103. Power converter 100 comprises a transformer 130 having a primary winding 132, a secondary winding 134, and a leakage inductance, which is modeled in FIG. 1 by an inductor 136 coupled in series with primary winding 132 and shown in phantom. One end of primary winding 132 is coupled to input port 101 and an input filtering capacitor 104. A power switch 110, preferably a FET 111 (which, as is well known, has a body diode 112 and stray capacitance 113 coupled between its drain and its source), is coupled between the other end of the primary winding and ground. One end of secondary winding 134 is coupled through a rectifier 140 to a terminal of output port 102 and the other end of secondary winding 134 is coupled to the other terminal of output port 102. A capacitor 142 is coupled between the terminals of output port 102.

During operation, power switch 110 is repeatedly switched on and off, alternately coupling input voltage $V_{IN}$ across primary winding 132. When power switch 110 closes for an ON period (i.e., the drive cycle), input voltage $V_{IN}$ is coupled across primary winding 132, causing current $I_M$ to flow through winding 132 and magnetic energy to be stored in transformer 130. During the ON period, rectifier 140 blocks current from flowing through secondary winding 134. When power switch 110 opens at the beginning of a subsequent OFF period (i.e., the flyback cycle), the stored energy in transformer 130 is coupled from secondary winding 134 to output port 102 by means of a secondary current $I_S$ conducted through rectifier 140 to output port 102. This energy is stored on capacitor 142, which generates an output voltage $V_{OUT}$. $V_{OUT}$ is coupled to load 103 via output port 102.

When power switch 110 is closed during an ON period, a current is also generated through leakage inductance 136 and energy is stored therein. At the beginning of each OFF period in a conventional flyback power converter, the current in inductance 136 would continue to flow, flowing into the stray capacitance 113 of FET 111 and raising the drain voltage $V_D$ of FET 111. As is well known, a high-frequency resonant circuit would be formed by leakage inductance 136 and capacitance 113 in many prior art flyback converters, causing "ringing" at the beginning of each OFF period as energy is transferred between capacitance 113 and inductance 136, and causing a leakage inductance voltage spike to be generated across secondary winding 134. In prior art flyback converters, this resonant circuit is conventionally damped by a conventional "snubber" circuit, which dissipates the energy of this resonant circuit, and the leakage inductance voltage spike is damped by an inductor or "choke" coupled in series with the secondary winding. Unfortunately, the values of leakage inductance 136 for flyback converters is relatively large in comparison to the magnetizing inductances of such transformers, and a relatively large amount of energy is wasted in such snubber circuits. Moreover, prior art secondary-side chokes are undesirably bulky.

In power converter 100 according to the present invention, the energy in leakage inductance 136 is captured and returned to the input power source at input port 101 by an active clamp circuit, thereby recycling the energy and also eliminating the leakage inductance voltage spike. The active clamp circuit comprises a series combination of an auxiliary switch 120, preferably a FET 121 (shown with body diode 122 and stray capacitance 123 coupled between its drain and its source), and a storage capacitor 125. This series combination is preferably coupled, as shown in FIG. 1, between the switched terminal of primary winding 132 (i.e., the terminal of winding 132 which is coupled to the drain terminal of power switch 110) and input port 101. Auxiliary switch 120 operates substantially in anti-phase relation to power switch 110. The operation of switches 110 and 120 is non-overlapping, with auxiliary switch 120 closing after power switch 110 opens and opening before power switch 110 next closes. Body diode 122 is oriented to enable current to flow from leakage inductance 136 to capacitor 125. When auxiliary switch 120 is closed, capacitor 125 applies a reversing voltage to the series combination of the primary winding 132 and leakage inductance 136. This reversing voltage has a polarity which is opposite to that of the voltage applied to the series combination during the preceding ON period.

During the initial portion of the flyback cycle, therefore, the energy stored in primary winding 132 and leakage inductance 136 during the drive cycle is released, generating an auxiliary current $I_A$ that flows into capacitor 125, increasing the charge stored thereon. However, because of the opposite polarity of the reversing voltage, the magnitude of the current through inductance 136 and winding 132 decreases toward zero amperes. Once reaching zero amperes, the reversing voltage of capacitor 125 causes current $I_A$ to become negative, that is to flow in the opposite direction and flow through the series combination of inductance 136 and winding 132, thus returning the energy captured by capacitor 125 to capacitor 104. The energy stored in leakage inductance 136 is thus returned to the input power source, rather than being dissipated as waste energy by a snubber circuit. Since this energy is not dissipated, the conversion efficiency of power converter 100 is improved over that of a conventional flyback converter. Capacitor 125 preferably has a large capacitance, so that the reversing voltage is maintained at a relatively constant value during the OFF period. As is known in the active clamp art, capacitor 125 naturally reaches, by transient charging, a well-defined voltage for each set of steady-state operating conditions.

In addition to recycling the energy stored in leakage inductance 136, the above-described active clamp circuit allows for zero voltage switching of power switch 110. As described above, auxiliary switch 120 is turned on during the flyback cycle, allowing a reverse current to be conducted from capacitor 125 through leakage inductance 136 and primary winding 132. This reverse current slowly lowers the voltage of capacitor 125 and capacitance 113, which is relatively small in comparison to the capacitance of capacitor 125. To provide zero voltage switching, auxiliary switch 120 is turned off for a period of time before power switch 110 is again turned on. When power switch 120 is turned off, the reverse current through leakage inductance 136 and primary winding 132 continues to flow. Since capacitance 113 is relatively small in comparison to capacitor 125, the reverse current quickly lowers the voltage stored on capacitance 113, reducing drain voltage $V_D$ to zero before power switch 110 is turned on.

In addition to recycling the energy stored in the leakage inductance and providing zero voltage switching for a continuous flyback power converter, the present invention shapes the output voltage waveform to eliminate undesirable harmonic content, thereby eliminating the need for a secondary-side choke, and allows for zero voltage turn-on of rectifier 140, thereby reducing power losses in this rectifier. In prior art flyback circuits without a secondary-side choke, at the beginning of each flyback cycle, the voltage across secondary winding 134 would quickly rise to a high value and the secondary current would quickly begin to flow with a high initial value, thereafter ramping down to a lower value.

In power converter 100, at the beginning of the flyback cycle, the energy stored in the transformer core and the leakage inductance will initially be released from the primary winding 132 and directed to capacitor 125, with no current initially flowing through secondary winding 134. The voltage across secondary winding 134 will rise as current through the primary winding decreases, thereby forward biasing rectifier 140 before substantial current is flowing in the secondary circuit, and further thereby reducing turn-on losses in rectifier 140. In other words, the primary current is not immediately cut off at the beginning of each flyback cycle as in many prior art circuits. The voltage across secondary winding 134 will not immediately jump as high as in prior art circuits, and instead will rise more slowly with correspondingly reduced harmonic content in the output voltage waveform. For these reasons and because the leakage inductance voltage spike is eliminated, no secondary choke is necessary.

Power converter 100 includes a control means 150 that controls the conduction state of FETs 111 and 121 to provide the desired non-overlapping, anti-phase switching relationship described above and discussed further below in connection with FIG. 2. To do so, control means 150 generates appropriately timed voltage pulses in the power switch drive voltage $V_P$ between the gate and source of FET 111 and in the auxiliary switch drive voltage $V_A$ between the gate and source of FET 121. Various ways of generating these control signals to FETs 111 and 121 will be apparent to those skilled in the art based on the present disclosure and an explanation thereof is not necessary to enable one of ordinary skill in the art to make and use the present invention. An isolation transformer 152 is coupled between control means 150 and FET 121 so that isolation is maintained between power switch 110, having its source grounded, and auxiliary switch 120, having its source voltage varying with drain voltage $V_D$.

Figure 2:
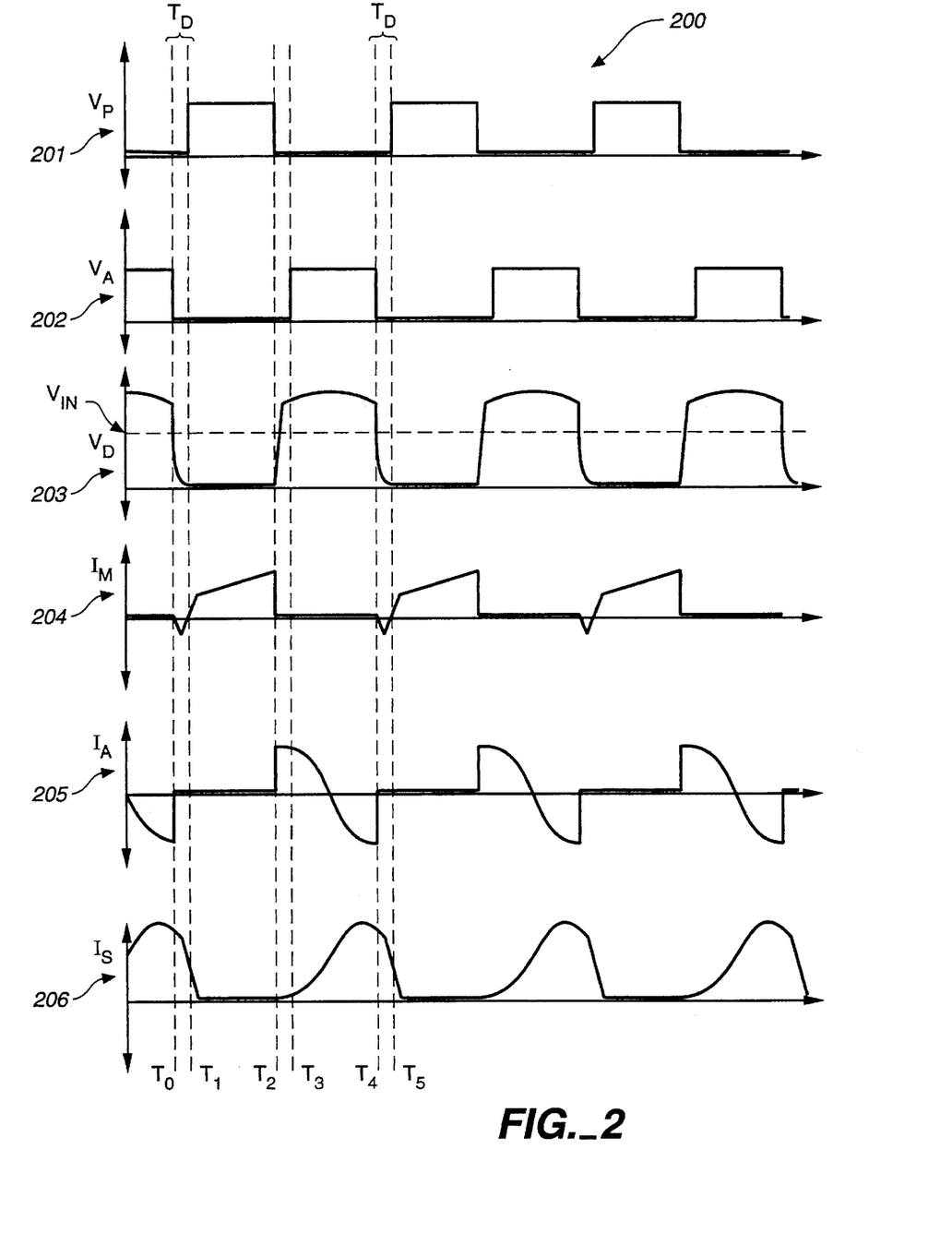
FIG. 2 is a timing diagram of selected voltages and currents of the flyback converter shown in FIG. 1.

Referring now to FIG. 2, the operation of electrical power converter 100 will be further described. FIG. 2 shows a timing diagram 200 illustrating selected voltages and currents during several switching cycles of operation of power converter 100.

Timing diagram 200 comprises six interrelated timing diagrams 201–206, each depicting a voltage or current level within power converter 100 as a function of time. Time lines $t_0$ through $t_5$ cut vertically through diagrams 201–206 at selected time points, thereby correlating the values of each illustrated voltage or current level at that point in time.

The gate drive voltages $V_P$ and $V_A$ to FETs 111 and 121, respectively, are shown in diagrams 201 and 202, respectively. The high voltage levels shown in diagrams 201 and 202 are conventional gate voltage levels sufficient to turn on their respective FETs, and the illustrated low voltage levels corresponds to a non-conducting state of the respective FETs. High and low voltage levels of voltage $V_P$ illustrate the drive cycles and flyback cycles, respectively, of power converter 100. As illustrated, drive cycles begin at times $t_1$ and $t_5$ and flyback cycles occur prior to $t_1$ and between $t_2$ and $t_5$. As explained above, FET 121 is turned on during flyback cycles (at time $t_3$) and is turned off during flyback cycles (at times $t_0$ and $t_4$). After a delay period $t_D$ from the times at which FET 121 is turned off, FET 111 is turned on (at times $t_1$ and $t_5$).

The drain voltage $V_D$ of FET 111 (at the node where switches 110 and 120 are coupled to primary winding 132) is shown in diagram 203. After power switch 110 is turned off, between times $t_2$ and $t_3$, voltage $V_D$ rises to a value much higher than the input voltage $V_{IN}$ due to the inductance in the primary winding. As apparent from the timing diagram, voltage $V_D$ does not immediately rise to its highest value and there is no leakage inductance voltage spike, for the reasons explained above, due to the primary current being redirected to capacitor 125. As the primary current decreases and then reverses, however, voltage $V_D$ peaks and begins to fall, as shown between times $t_3$ and $t_4$ in timing diagram 203. At time $t_4$, auxiliary switch 120 is turned off, and the reverse current through primary winding 132 rapidly reducing the voltage across stray capacitance 113, causing voltage $V_D$ to fall quickly to zero, as shown between times $t_4$ and $t_5$ in diagram 203. Thus, voltage $V_D$ is substantially equal to zero volts when power switch 110 turns on again at time $t_5$, thus implementing zero voltage switching.

The current $I_M$ through power switch 110, from primary winding 132 to ground, is shown in diagram 204. At the beginning of each drive cycle, current $I_M$ jumps quickly to a positive value. This is due to the magnetizing energy remaining in the transformer at the end of the flyback cycle, since power converter 100 is operating in continuous mode. (It will be recognized by those skilled in the art that, in discontinuous converters, the primary current would have ramped up linearly from substantially zero amps.) After reaching an initial positive value, according to the present invention, current $I_M$ ramps up relatively linearly for the remainder of the drive cycle. At the beginning of the flyback cycle, current $I_M$ falls to zero because power switch 110 is turned off and primary current is redirected to capacitor 125. At the end of the flyback cycle, after auxiliary switch 120 is turned off, the reverse current through primary winding 132 pulls current in the reverse direction through capacitor 113 as voltage $V_D$ is drawn to zero, as shown by current $I_M$ reaching a negative value during delay periods $t_D$.

The current $I_A$ through auxiliary switch 120, from primary winding 132 to capacitor 125, is shown in diagram 205. As shown at time $t_2$, at the beginning of each flyback cycle, current $I_A$ jumps quickly to the value that current $I_M$ had at the end of the drive cycle, because the current through power switch 110 is redirected to capacitor 125 through auxiliary switch 120. This redirected current initially flows through body diode 122, transferring both energy from the leakage inductance 136 and magnetizing energy from the core of transformer to capacitor 125, causing the voltage stored thereon to rise. Because the primary current is redirected to capacitor 125, there is no need for a snubber circuit to dissipate the leakage inductance energy, and there is no voltage spike produced by the leakage inductance in the secondary circuit. While current is flowing to capacitor 125, auxiliary switch 120 turns on, enabling current $I_A$ to flow through FET 121 to capacitor 125 and, when appropriate, to reverse. As shown between times $t_2$ and $t_4$, current $I_A$ decreases and then reverses when the leakage inductance energy has been transferred to capacitor 125 and the secondary current $I_S$ has reached a high enough value so that it is releasing the magnetizing energy from transformer 130 at a relatively high rate. The reverse current $I_A$ therefore returns energy from capacitor 125 to capacitor 104 via primary winding 132, thereby recycling the energy that had been stored in the leakage inductance. The precise time when auxiliary switch 120 turns on is not critical to the present invention (it may, for example, turn on as soon as power switch 110 is turned off), but it should turn on before the time at which $I_A$ would tend to reverse based on the resonant characteristics of the clamp circuit. When auxiliary switch 120 is turned off, current $I_A$ falls to a value close to zero, as shown at time $t_4$. After auxiliary switch 120 is turned off, the reverse current $I_A$ may continue to flow through stray capacitance 123 of FET 121 at a very low value, but current $I_A$ does not begin flowing again in any substantial value until the end of the next drive cycle.

The current $I_S$ flowing out of secondary winding 134 is shown in diagram 206. As illustrated and explained above, current $I_S$ is equal to zero amps during each drive cycle. At the beginning of each flyback cycle, current $I_S$ remains at about zero amps because the energy stored in the transformer is directed to capacitor 125. This allows rectifier 140 to become forward biased before substantial current is directed through it, thereby minimizing forward recovery losses and reducing high frequency noise generation. As the primary current decreases, however, current $I_S$ rises at an increasing rate until all magnetizing energy from the transformer is being released through secondary winding 134. As the magnetizing energy is released, the value of current $I_S$ begins to fall. The reverse current through primary winding 132 induces additional current in secondary winding 134, slowing the rate of decrease of current $I_S$. Thus, the value of capacitor 125, which affects the maximum reverse current that flows through the primary winding, causes the secondary current $I_S$ to flow for a longer period of time and ensures that there is time for zero voltage switching at high frequencies where the leakage inductance is low. As explained above, before all magnetizing energy has been released through secondary winding 134 (that is, the magnetizing current continues to flow in the same direction as during the drive cycle and magnetic flux is oriented in the same direction as during the drive cycle), power switch 110 is turned on and current $I_S$ ceases to flow. As illustrated, current Is resembles a half sinusoidal waveform and has a relatively low high frequency harmonic content, as compared to the trapezoidal output current waveforms common in prior art flyback converters operated in continuous mode. This reduces power losses.

The present invention also reduces reverse recovery power losses in rectifier 140, as compared to reverse recovery losses in the secondary-side rectifier of conventional, continuous flyback converters. Reverse recovery losses are reduced in the present invention because the conditions in the primary circuit at the beginning of each drive cycle are different than in prior art flyback converters and cause a lower rate of change in the voltage across and current through rectifier 140 at the beginning of each drive cycle. Specifically, as described above, the voltage at the drain of switch 110 has dropped to zero and a reverse current is conducted through the primary winding at the end of the flyback cycle, immediately prior to each drive cycle. These conditions reduce the rate of change in the voltage across rectifier 140 and the current through rectifier 140 during the reverse recovery period of rectifier 140 at the beginning of each drive cycle. This also results in a reduced level of EMI at the beginning of each drive cycle. In prior art continuous flyback converters, the primary power FET is "hard switched" into a conducting state, and this results in well known high rates of change in the current and voltage seen by the secondary side rectifier, and high EMI.

In prior art continuous flyback power converters, when the primary power FET is turned on at the beginning of each drive cycle, the current through the primary winding immediately jumps from zero to a finite value that depends on the magnetizing current in the transformer at that time, and the secondary current immediately drops to zero (a high rate of change that increases reverse recovery losses). As shown in diagram 204, according to the present invention, the current through the primary winding at the beginning of each drive cycle will ramp up more slowly than in prior art continuous flyback power converters. Correspondingly, the current through the secondary winding decreases at a slower rate (in fact, dropping to zero in about 80 nanoseconds) than in prior art continuous flyback converters. The delay in the rise of the primary current allows time for switch 110 to turn on under zero voltage switching conditions. The delay in the decrease of the secondary current helps to reduce reverse recovery losses in rectifier 140, as explained above.

Power converter 110 is preferably operated at a frequency of 250 kHz to 500 kHz. At frequencies up to about 250 kHz, a small amorphous saturating bead may be placed between secondary winding 134 and rectifier 140 to help reduce reverse and forward recovery losses in rectifier 140, in a conventional manner, by helping to limit the rate of change in current through the rectifier when it is switched between a forward and reverse biased state.

As explained above, the drain voltage of FET 111 is brought to zero, in order for zero voltage switching to occur, by generating a reverse current $I_A$ from capacitor 125 through leakage inductance 136 to winding 132 and opening switch 120 prior to the beginning of the drive cycle. The reverse current through the leakage inductance then pulls the drain voltage $V_D$ to zero. It will be appreciated that higher $V_D$ requires higher peak reverse current $I_A$ and/or higher leakage inductance 136. In fact, the drain voltage that can be reduced to zero by the active clamp system is substantially proportional the square root of formula (1), below:

$$L_{leakage} * I_{A,peak}^2 / K \qquad (1)$$

where $L_{leakage}$ is the value of inductor 136 and $I_{A,peak}$ is the current through switch 120 in the direction toward inductor 136 when switch 120 is turned off. K is given by formula (2), below:

$$K = V_{C113} + V_{C125} + V_{Ctrans} + (V_{Crect}/(\text{turns ratio})^2) \qquad (2)$$

where $V_{C113}$ the voltage stored on capacitor 113, $V_{C125}$ is the voltage stored on capacitor 123, $V_{Ctrans}$ is the voltage stored on the inherent transformer capacitance across primary winding 132, and $V_{Crect}$ is the voltage stored on the stray capacitance of rectifier 140.

As the formulas given above indicate, the amount of voltage that can be eliminated from the drain of FET 111 to allow for zero voltage switching is functionally related to the values of the primary leakage inductance and the peak reverse current through FET 121 and inductor 136 when FET 121 is turned off. If the leakage inductance is smaller, less time is available to drop the drain voltage to zero and a higher reverse current through FET 121 and inductor 136 will be necessary in order to reduce a given voltage at the drain of FET 111 to zero. It will be appreciated by those skilled in the art, based on the present disclosure, that the amount of reverse current $I_A$ can be tuned to accommodate the value of the leakage inductance and the drain voltage that must be dropped to provide zero voltage switching, and that this is accomplished by adjusting the value of capacitor 125 as necessary. A smaller leakage inductance allows for zero voltage switching at higher frequencies because a shorter period is used to reduce the voltage to zero.

In a preferred embodiment, multiple series transformers are used in place of transformer 130 of FIG. 1. The effective size of the magnetic transformer system is increased by using multiple series transformers without the need for a single, high volume component that would dictate the size and shape of the entire power converter. The use of multiple transformers, rather than a single large transformer, allows the power converter to fit in low profile packages because the thickness of the cores of each transformer does not need to be as thick as if a single transformer were used. Multiple transformers also result in lower overall leakage inductances and permits higher frequency operation. In addition, multiple small transformers decrease the total amount of magnetic losses in the transformer cores, as compared to a single large transformer.

Figure 3:
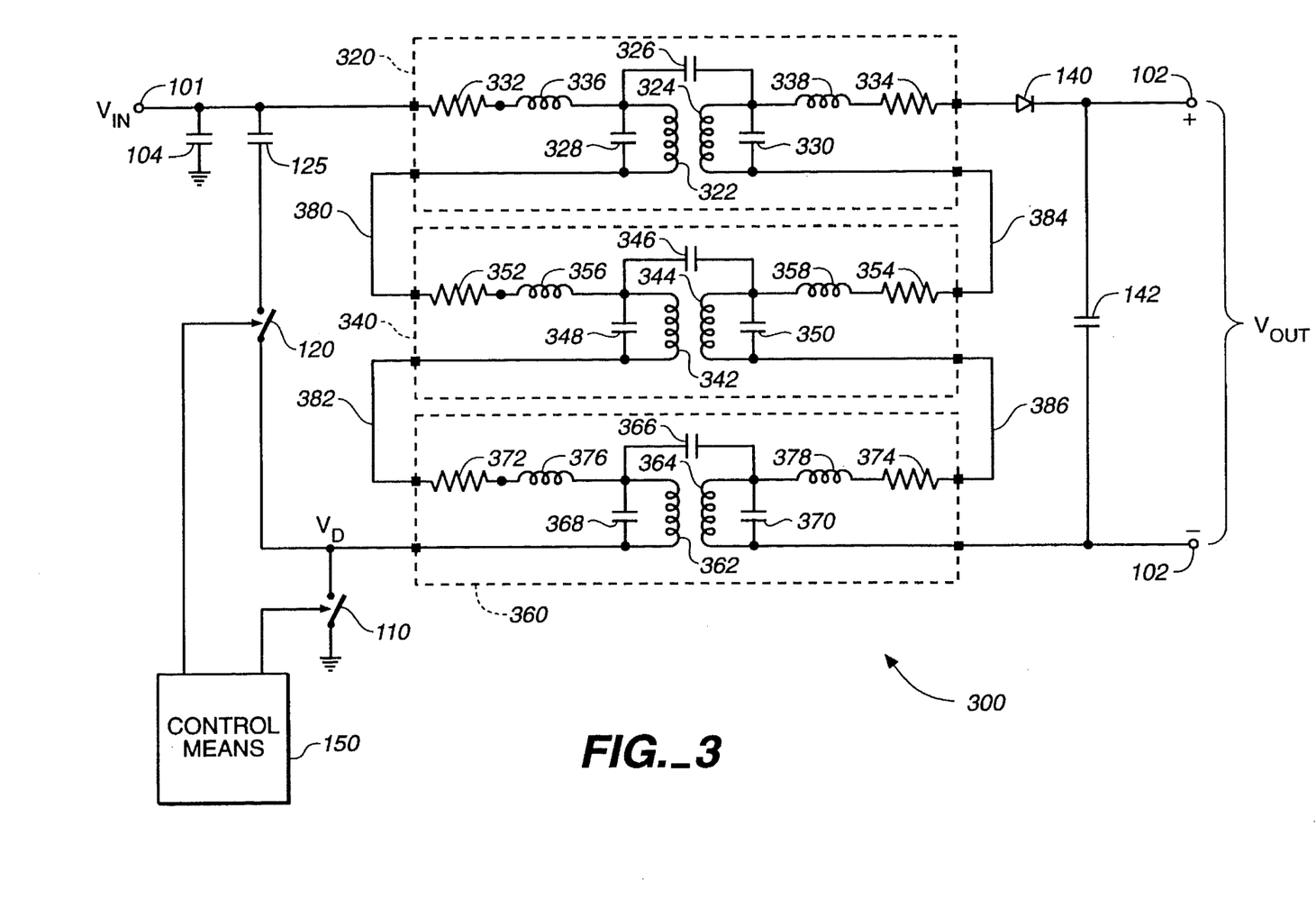
FIG. 3 is a schematic diagram of a second embodiment of a flyback converter according to the present invention.

An embodiment of a power converter having multiple series transformers according to the present invention is shown at 300 in FIG. 3. Many of the components are the same as described in connection with FIG. 1 and have numbering identical to the numbering in FIG. 1. The basic operation of power converter 300 is consistent with the description given in connection with FIG. 2, with the additional advantages described above.

Power converter 300 preferably includes three series-connected transformers 320, 340 and 360. Transformers 320, 340 and 360 include primary windings 322, 342, and 362, respectively, and secondary windings 324, 344, and 364, respectively. As is well known, transformers 320, 340, and 360 each have an inherent capacitance between their primary and secondary windings (modeled by capacitors 326, 346, and 366, respectively), between each end of their respective primary windings (modeled by capacitors 328, 348, and 368, respectively), and between each end of their respective secondary windings (modeled by capacitors 330, 350, and 370, respectively). As is also known, each transformer will have inherent resistive losses in each winding, which are modeled by resistors 332, 334, 352, 354, 372, and 374 each shown in series with a transformer winding. Finally, as is also known, each transformer will have inherent leakage inductances in each winding, which are modeled by inductors 336, 338, 356, 358, 376, and 378 each shown in series with a transformer winding.

One end of primary winding 322 is coupled to $V_{IN}$. The other end of primary winding 322 is coupled to an end of primary winding 342 at node 380. The other end of primary winding 342 is coupled to one end of primary winding 362 at node 382. The other end of primary winding 362 is coupled to power switch 110 at the drain of FET 111. Nodes 380 and 382 are the bus bar primary connections.

One end of secondary winding 324 is coupled to rectifier 140 and the other end of secondary winding 324 is coupled to secondary winding 344 at node 384. The other end of secondary winding 344 is coupled to an end of secondary winding 364 at node 386. The other end of secondary winding 364 is coupled to a terminal of output port 102. Nodes 384 and 386 are the bus bar secondary connections.

As noted above, the sum of primary leakage inductances 336, 356, and 376 will be less than the leakage inductance of a large single transformer with equivalent effective magnetic area. In addition, the series primary and secondary of the transformers operates in part as a lossless delay line to help provide some zero voltage switching capability.

Details of preferred (not required) component types/values for elements of power converter 100 are provided below.

| | |
|---|---|
| $V_{IN}$ | 180–400 V |
| $V_{OUT}$ | 12–48 V |
| Transformer 130 | Magnetics DR43622 Core 16 Tpri, 2 Tsec |
| FET 111 | APT6030BN or APT8075BN |
| FET 121 | APT601R3 or IRBC40 |
| Capacitor 125 | 0.06 microF, 500 V, ceramic |
| Rectifier 140 | XGR818 Gallium Arsenide (2 in parallel) or MUR1620 or MURH840 (2 in parallel) |
| Capacitor 104 | 0.47 microF, 400 V, polyester, multilayer plastic |
| Capacitor 142 | 12 microF, 100 V, multilayer plastic (preferably comprising 3 capacitors of 4 microF each |
| Inductance 136 | 4.67 microH |
| Power Level of Converter | 200 Watts or less |
| Switching Frequency | 500 kHz |

Details of preferred component types/values for elements of power converter 300 not already given above are shown below.

| | |
|---|---|
| Preferred Turns Ratio (each transformer) | 6:2 |
| Resistors 332,352,372 | 0.6 Ohm |
| Resistors 334,354,374 | 10 mOhm |
| Inductors 336,356,376 | 0.6 microH |
| (0.6 microH = series sum of 336 + (338/turns ratio), etc . . . ) | |
| Inductors 338,358,378 | 67 nanoH |
| Windings 322,342,362 | 20–21 microH |
| Windings 324,344,364 | 2.24–2.29 microH |
| Capacitors 328,348,368 | approx. 5 picoF |
| Capacitors 330,350,370 | approx. 10 picoF |
| Capacitors 326,346,366 | approx. 12 picoF |

Continuous flyback converts according to the present invention perform with exeptionally high efficiency over wide rages of load currents and input voltages. In fact, the efficiency of converters according to the present invention remain in the range of 80% to 95% over an input voltage in at least the range of 180 V to 400 V and a load current in at least the range of 2 amps to 11 amps.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A flyback power converter, comprising:

an input port for receiving an input voltage and an output port for providing an output voltage to a load;

a transformer including a primary winding and a secondary winding;

a power switch for alternately coupling said input voltage across said primary winding, said power switch having an ON state when said input voltage is coupled across said primary winding through said power switch and an OFF state when said input voltage is not coupled across said primary winding through said power switch, energy being stored in said transformer during said ON state and energy being released from said transformer through said secondary winding during said OFF state, said power switch having a first conduction terminal and a second conduction terminal, conduction of electrical current from said first conduction terminal to said second conduction terminal being enabled only during said ON state, the voltage across said first conduction terminal and said second conduction terminal defining a switch voltage;

control means for switching said power switch between said ON state and said OFF state such that the flyback power converter operates in a continuous mode;

output circuit means coupled to said secondary winding for producing an output voltage at said output port from said energy released from said transformer through said secondary winding during said OFF state; and means for controlling said switch voltage such that said switch voltage is substantially equal to zero volts when said power switch is switched to said ON state from said OFF state.

2. The flyback power converter of claim 1, wherein said means for controlling said switch voltage comprises:

a capacitor;

a current path enabling electrical current to be conducted through said path from said first conduction terminal to said capacitor during said OFF state;

an auxiliary switch coupled between said first conduction terminal and said capacitor, said auxiliary switch having an auxiliary ON state in which electrical current is enabled to be conducted from said capacitor to said first conduction terminal, and an auxiliary OFF state in which electrical current is not enabled to be conducted from said capacitor to said first conduction terminal;

wherein said auxiliary switch is switched to said auxiliary ON state while said power switch is in said OFF state, enabling a reverse current to be conducted from said capacitor through said first conduction terminal and said primary winding, and wherein said auxiliary switch is switched to said auxiliary OFF state a selected period of time before said power switch is switched to said ON state such that said reverse current conducted through said primary winding lowers said switch voltage to approximately zero volts before said power switch is switched to said ON state.

3. The flyback power converter of claim 2, wherein said auxiliary switch is a FET and said current path comprises a body diode of said FET.

4. The converter of claim 2 wherein the secondary current increases in value at the beginning of the OFF state of the power switch and decreases in value prior to the end of the auxiliary ON state of said auxiliary switch.

5. The converter of claim 2 wherein the voltage across said capacitor has a substantially sinusoidal waveform during the OFF state of said power switch.

6. The converter of claim 2 wherein the current flowing through said capacitor during the OFF state of said power switch has a sinusoidal shape.

7. The converter of claim 2 wherein the current flowing through said capacitor during the OFF state of said power switch has a waveform which undergoes substantially a half-cycle of a sinusoid.

8. The flyback power converter of claim 1, wherein said transformer comprises a plurality of series-connected transformers.

9. The flyback power converter of claim 1, wherein said output circuit means comprises a rectifier that is forward biased during said OFF state to enable a secondary current to be conducted in said secondary winding during said OFF state and reverse biased during said ON state to prevent said secondary current from being conducted during said ON state.

10. The flyback power converter of claim 9, wherein said means for controlling said switch voltage comprises means for shaping said secondary current in said secondary winding such that said secondary current is substantially equal to zero amps when said rectifier becomes forward biased during said OFF state.

11. The flyback power converter of claim 9, wherein said means for controlling said switch voltage comprises means for reducing reverse recovery losses in said rectifier when said rectifier becomes reverse biased.

12. The flyback power converter of claim 1, wherein said primary winding comprises a leakage inductance.

13. The flyback power converter of claim 12, wherein said means for controlling said switch voltage comprises means for substantially preventing a leakage inductance voltage spike across said secondary winding from being caused by said leakage inductance.

14. The flyback power converter of claim 12, wherein energy is stored in said leakage inductance during said ON state, further comprising means for recycling said energy stored in said leakage inductance.

15. The flyback power converter of claim 1 wherein each said ON state and subsequent OFF state comprise a switching cycle, and wherein the magnetizing current flows continuously in one direction during a plurality consecutive switching cycles.

16. The converter of claim 1 wherein the secondary current starts at the beginning of the OFF state of said power switch at substantially zero amperes, and increases in value with an increasing rate of change at the beginning of said OFF state.

17. The converter of claim 1 wherein the secondary current increases in value at the beginning of the OFF state of the power switch and decreases in value prior to the end of said OFF state.

18. The converter of claim 17 wherein the secondary current has a substantially half-sinusoidal waveform during the OFF period.

19. The converter of claim 1 wherein each ON state and subsequent OFF state of said power switch comprises a switching cycle, and wherein the frequency a plurality of consecutive switching cycles is at least 250 kHz.

20. The converter of claim 1 wherein an amorphous bead is magnetically coupled to the secondary winding.

21. A flyback power converter comprising:

an input port for receiving a source of input power and an output port for providing power to a load;

a transformer having a primary winding, a secondary winding, a magnetizing inductance through which a corresponding magnetizing current flows, and a primary leakage inductance;

a power switch coupled in series with said primary winding at a circuit node, the series combination of the primary winding and power switch being coupled to said input port, said power switch being switched in alternating ON and OFF states wherein power is coupled from said input port to the primary winding during ON states and wherein substantially no power is coupled during OFF states, said transformer storing energy in its magnetizing inductance during said ON states and releasing energy during OFF states;

a rectifier coupled in series with the secondary winding such that current is substantially blocked from flowing to said output port during ON states of the power switch and is enabled to flow during OFF states;

a series combination of a capacitor and an auxiliary switch, said series combination having one terminal coupled to said circuit node and a second terminal coupled to a terminal of said input port, said auxiliary switch having an auxiliary ON state in which electrical current is enabled to be conducted between said capacitor and said circuit node and an auxiliary OFF state in which electrical current is not enabled to be conducted, said auxiliary switch being switched to said auxiliary ON state while said power switch is in said OFF state and switched to said auxiliary OFF state a selected period of time before said power switch is switched to its ON state; and wherein said power switch is operated such that the magnetizing current of said magnetizing inductance flows continuously in one direction during a plurality consecutive ON states of said power switch; and wherein said capacitor, said auxiliary switch, and said primary leakage inductance generate a reverse current in said leakage inductance during the OFF state of said power switch which lowers the voltage across the power switch in said selected time period prior to said power switch being switched to its ON state.

22. The converter of claim 21 wherein the secondary current starts at the beginning of the OFF state of said power switch at substantially zero amperes, and increases in value with an increasing rate of change at the beginning of said OFF state.

23. The converter of claim 21 wherein the secondary current increases in value at the beginning of the OFF state of the power switch and decreases in value prior to the end of said OFF state.

24. The converter of claim 23 wherein the secondary current has a substantially half-sinusoidal waveform during the OFF period.

25. The converter of claim 21 wherein the secondary current increases in value at the beginning of the OFF state of the power switch and decreases in value prior to the end of the auxiliary ON state of said auxiliary switch.

26. The converter of claim 21 wherein each ON state and subsequent OFF state of said power switch comprises a switching cycle, and wherein the frequency a plurality of consecutive switching cycles is at least 250 kHz.

27. The converter of claim 21 wherein an amorphous bead is magnetically coupled to the secondary winding.

28. The converter of claim 21 wherein the voltage across said capacitor has a substantially sinusoidal waveform during the OFF state of said power switch.

29. The converter of claim 21 wherein the current flowing through said capacitor during the OFF state of said power switch has a sinusoidal shape.

30. The converter of claim 21 wherein the current flowing through said capacitor during the OFF state of said power switch has a waveform which undergoes substantially a half-cycle of a sinusoid.

* * * * *